United States Patent [19]
Mendelsohn et al.

[11] 4,358,429
[45] Nov. 9, 1982

[54] OXYGEN STABILIZED ZIRCONIUM VANADIUM INTERMETALLIC COMPOUND

[75] Inventors: Marshall H. Mendelsohn, Woodridge; Dieter M. Gruen, Downers Grove, both of Ill.

[73] Assignee: The United States of America as represented by the United States Department of Energy, Washington, D.C.

[21] Appl. No.: 308,966

[22] Filed: Oct. 6, 1981

[51] Int. Cl.³ .................... B01D 53/34; C01G 25/02; C01G 31/02
[52] U.S. Cl. .................................. 423/248; 423/593; 423/644; 423/648 R
[58] Field of Search ................. 423/248, 593, 644, 648

[56] References Cited
U.S. PATENT DOCUMENTS

| | | | |
|---|---|---|---|
| 3,793,435 | 2/1974 | Reilly et al. | 423/248 |
| 3,825,418 | 7/1974 | Reilly et al. | 75/159 |

OTHER PUBLICATIONS

Reilly et al., "Hydrogen Storage and Purification Systems", BNL 17136, pp. 4-8.
"Metallurgical Studies of Hydrogen Storage Alloys", DOE/CS 0016-T2, Apr. 1980, pp. 1-6.
"Metal Hydrides Make Hydrogen Accessible-I", Chemtech, Sep. 1980, pp. 578-583.
"Metal Hydrides Make Hydrogen Accessible-II", Chemtech, Dec. 1980, pp. 768-773.
Cholera et al., "Hydrogen Separation and Production from Coal-Derived Gases", Proc. of the 12th Intersociety Energy Conversion Engineering Con., 1977, pp. 981-986.

*Primary Examiner*—Earl C. Thomas
*Attorney, Agent, or Firm*—James W. Weinberger; Walter L. Rees; Richard G. Besha

[57] ABSTRACT

An oxygen stabilized intermetallic compound having the formula $Zr_xOV_y$ where $x=0.7$ to $2.0$ and $y=0.18$ to $0.33$. The compound is capable of reversibly sorbing hydrogen at temperatures from $-196°$ C. to $450°$ C. at pressures down to $10^{-6}$ Torr. The compound is also capable of selectively sorbing hydrogen from gaseous mixtures in the presence of CO and $CO_2$.

7 Claims, No Drawings

OXYGEN STABILIZED ZIRCONIUM VANADIUM INTERMETALLIC COMPOUND

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to a new oxygen stabilized intermetallic compound and to a method of storing hydrogen using that compound. More specifically, this invention relates to a new oxygen stabilized zirconium-vanadium intermetallic compound, to a method of storing hydrogen and to a method of separating hydrogen from other gases using that compound.

Hydrogen for use as a fuel or as a raw material may be produced by the steam reforming of a hydrocarbon such as coal or it may be formed in waste gas streams resulting from the processing of hydrocarbons such as crude oil. In either situation, the hydrogen is found mixed with other gases which may include CO, $CO_2$, $O_2$, $N_2$ and water vapor.

In order to utilize the hydrogen, it is necessary to separate it from the other gases. One present commercial process for hydrogen separation utilizes palladium films in which at about 320° C. molecular hydrogen dissociates to atoms on palladium which after diffusion through the palladium, recombine on the opposite side of the film to form pure hydrogen. While this method is very efficient and effective, it is also very expensive.

The use of adsorbants which are selective for hydrogen over other gases has also be suggested. In U.S. Pat. No. 3,793,435, Feb. 19, 1974, the use of $LaNi_yCu_{5-y}$, where Y=1 to 4, selectively to absorb hydrogen from other gases is described. However, depending upon the amount of copper, the material is effective for sorbing hydrogen in the presence of no more than about 4% CO. The separation of hydrogen from a hydrogen-methane mixture using $Fe_xTiNi_{1-x}$ is described on pages 981-986 of the Proceedings on the 12th Intersociety Energy Conversion Engineering Conference (1977). However, it was brought out that $CO_2$ interferes with the sorption and that $CO_2$ and similar impurities will either have to be removed or a sorbant showing no interference to impurities in coal-derived gases will have to be developed.

Thus, insofar as is known, there are no sorbants which are completely satisfactory for the selective sorption of hydrogen from a stream of mixed gases.

SUMMARY OF THE INVENTION

A new oxygen stabilized intermetallic compound has been prepared which is capable of repeatedly sorbing hydrogen from a mixture of gases. In accordance with the invention, the intermetallic compound is an oxygen-stabilized zirconium-vanadium compound having the formula $Zr_xVO_y$, where x=0.7 to 2.0 and y=0.18 to 0.33. Hydrogen is separated from a gaseous mixture by exposing the mixture at a temperature of at least 25° C. and a pressure of at least 1.4 psia to an active form of an intermetallic compound of the formula $Zr_xVO_y$, where x=0.7 to 2.0 and y=0.18 to 0.33 whereby the hydrogen is selectively sorbed from the gaseous mixture to form a hydride.

It is therefore one object of the invention to provide a new intermetallic compound.

It is another object of the invention to provide a new intermetallic compound capable of adsorbing hydrogen to form a hydride.

It is still another object of the invention to provide an intermetallic compound capable of selectively adsorbing hydrogen from a mixture of gases.

Finally, it is the object of the invention to provide a process for recovering hydrogen from a mixture of gases.

DETAILED DESCRIPTION OF THE PREFERRED EMBODIMENT

The oxygen-stabilized intermetallic compound of the invention has the formula $Zr_xVO_y$ where X=0.7 to 2.0 and y=0.18 to 0.33.

Hydrogen is separated from a mixture of gases by contacting an active form of the oxygen-stabilized intermetallic compound at a temperature of from 200° to 400° C. at a pressure 14 to 15 psia with CO in an amount sufficient to saturate the compound to form a CO conditioned intermetallic compound, the conditioned compound is then contacted with a gaseous mixture containing at least 40 volume percent hydrogen at a pressure of at least 1.4 psia and a temperature of from about 25° to 450° C. whereby the hydrogen is preferentially absorbed by the intermetallic compound to form a metal hydride.

The active oxygen stabilized zirconium vanadium intermetallic compound is also capable of sorbing and storing hydrogen gas at pressures as low as $10^{-6}$ Torr and at temperatures down to $-196°$ C.

The compound is prepared by melting together appropriate quantities of high purity powders of zirconium and vanadium in a furnace under an inert atmosphere to form the compound. The oxygen is added by using an appropriate quantity of a metal oxide when preparing the intermetallic compound. Preferably, the mixture is melted several times in order to ensure complete homogeneity of the compound.

The homogenized intermetallic compound must be activated before it can be successfully used to sorb hydrogen. This is accomplished by contacting the compound with hydrogen at a pressure at least above the decomposition pressure of the hydride being formed, generally from one to two atmospheres at a temperature of from about room to 300° C., for a period of time sufficient to hydride the compound, generally ½ to 2 hours. It is preferred that the material be granulated to ¼ to ½ inch or smaller particles to ensure complete activation.

The compound is $Ti_2Ni$ type cubic Fd3m structure where the lattice parameter a=12.1 to 12.2 A°. The compound must contain from about 8 to about 14 atom percent (y=0.18 to 0.33) oxygen in order to stabilize the zirconium and vanadium into the $Ti_2Ni$ cubic structure which is capable of sorbing hydrogen. Quantities of oxygen less than about 8 atom percent or greater than about 14 atom percent will result in the formation of phase structures which are not suitable for sorbing hydrogen. Because of the broad homogeneity range of these compounds, the zirconium to vanadium ratio may vary from 0.7 to 2.1. Since the highest sorption rates are found in the zirconium rich compounds, the preferred ratio is from about 1:1 to 1.4:1.

For the recovery of hydrogen from a mixture of gases, the activated intermetallic compound is preferably conditioned first by being saturation with CO. While this conditioning step is not necessary when recovering hydrogen from a hydrogen-CO mixture, the presence of other compounds such as $O_2$, $CO_2$ and $N_2$ in the mixture could preferentially react with the intermetallic compound to form a different material having less capacity for hydrogen sorption. Preferably, the active compound is conditioned by contact with CO at a temperature from about 200°-400° C. at a pressure of 0.1 to 1.0 atmospheres until saturated.

The amount of hydrogen which the gaseous mixture must contain in order for selective sorption of hydrogen to take place is dependent upon the composition of the mixture. For example, a CO-hydrogen mixture must contain at least 40 volume percent hydrogen. The presence of other gases in the mixture such as $O_2$, $N_2$, $CO_2$, etc. requires that the hydrogen concentration be at least 65 volume percent in order for selective sorption of hydrogen by the intermetallic to take place. In the presence of mixed gases, temperatures as low as from 25° C. to about 450° C. at pressures of at least 1.4 psia are necessary for hydrogen sorption. The precise conditions under which selective $H_2$ sorption will take place will depend upon the particular combination of gases which are present in the mixture but will be within the general parameters disclosed herein.

The sorbed hydrogen can be recovered by heating the hydride to a temperature of at least about 500° C. at a pressure of 7.0 psia or less.

The hydrogen capacity of the compound of the invention has been found to be about 100 Torr-liters of hydrogen/gram at 30 psia. The hydrogen capacity of the compound after conditioning with CO has been found to be from about 70 to 90% of the capacity of the unconditioned compound.

EXAMPLE I 2.5542 gm of Zr metal powder, 0.919 gm of V metal powder and 0.1819 gm of $V_2O_5$ powder were mixed together and compressed together into a pellet using a ⅜" diameter die and a hydraulic die press. The pellet was then placed into an arc melting furnace. The furnace was evacuated and filled with argon gas. The pellet was then melted and remelted twice with a weight loss of less than 0.1%. The main phase as determined by X-ray diffraction was $Zr_3V_3O$ with a small amount of Zr metal also present. ($Zr_{1.4}VO_{0.25}$)

EXAMPLE II 1.8244 gm of Zr metal powder, 1.3245 gm of V metal powder and 0.1819 gm $V_2O_5$ powder were pelletized and melted as described in Example I. The main phase as determined by x-ray diffraction was $Zr_3V_3O$ with small amounts of Zr metal and V metal also present. ($Zr_{0.7}VO_{0.18}$)

EXAMPLE III 3.6488 gm of Zr metal powder, 0.9169 gm V metal powder and 0.1819 gm $V_2O_5$ powder were pelletized and melted as before. The main phase as determined by x-ray diffraction was $Zr_3V_3O$ with an amount of Zr metal greater than that of Example I. ($Zr_2VO_{0.25}$) This sample after activation and conditioning was found to have a capacity for hydrogen at 30 psia of 104.37 Torr-liters/gm.

EXAMPLE IV 0.4304 gm of the alloy of Example I was weighed out and placed in a quartz tube container. The alloy was activated by first evacuating the reactor tube and exposing the sample to 27.6 psia of $H_2$ gas. After absorbing 65.9 Torr-liters of $H_2$, the hydrogen was removed by heating to 750° C. and pumping out the hydrogen gas. The sample was then cooled to 400° C. and exposed to carbon monoxide gas. The sample rapidly absorbed about 14.9 Torr-liters of CO. The sample was then exposed to $H_2$ at 8 psia and absorbed the gas rapidly. The hydrogen capacity was found to be about 94.35 Torr-liters $H_2$/gm.

EXAMPLE V

The sample from Example IV was exposed at 300° C. to a gaseous mixture consisting of 75% $H_2$ and 25% CO at 300° C. 50% of the $H_2$ was absorbed by the sample in about 40 minutes. The sample was then heated and the hydrogen removed by pumping. The sample was cooled to 400° C. Again, about a 75%-25% CO mixture at about 4 psia was added to the sample. At this temperature, 50% of the $H_2$ was absorbed by the sample in about 8 minutes.

EXAMPLE VI 0.4620 gm of a sample of composition $ZrVO_{0.25}$ was activated at 28.9 psia and 300° C. The sample was then heated to 750° C. and pumped to remove the hydrogen gas before being cooled to 400° C. and conditioned by exposure to CO. The sample was then exposed to a gaseous mixture of 75% $H_2$-25% CO. At 8 psia and 400° C., 50% of the $H_2$ was absorbed in about 8 minutes.

EXAMPLE VII

After the absorbed $H_2$ was removed by heating and pumping, the sample from Example VI was exposed to 4 psia of a 47% $H_2$-53% CO mixture. At 400° C., 50% of the $H_2$ was absorbed in about 30 minutes.

EXAMPLE VIII

After removal of the sorbed $H_2$, the sample from Example VII was exposed to 3.6 psia of a 90% $H_2$-10% CO mixture. At room temperature, all of the $H_2$ was absorbed in about 15 seconds.

EXAMPLE IX

The compound from Example IV was exposed to 4 psia of a mixture consisting of 75% $H_2$ and 25% $N_2$. At 365° C., 50% of the $H_2$ was absorbed in about 2 minutes.

EXAMPLE X 0.7846 gm of the compound from Exampl III, after activation and conditioning with CO, was exposed to 3.7 psia of a mixture of 67% $H_2$, 26% $N_2$ and 6% $O_2$. The mixture also contained about 1% water vapor although the quantity was not precisely determined. At 300° C., 50% of the $H_2$ was absorbed in about 5 minutes.

EXAMPLE XI 0.4304 gm of $Zr_{0.7}VO_{0.18}$ (from Example IV) was exposed to 4 psia of a mixture of 75% $H_2$-25% $CO_2$. At 350° C., 50% of the $H_2$ was absorbed in less than 30 seconds.

EXAMPLE XII

The intermetallic from the previous Example was then exposed to 4 psia of a mixture of 75% $H_2$, 20% $CO_2$–4.5% $N_2$ and 0.5% CO. At 400° C., 50% of the $H_2$ was absorbed in less than 15 seconds.

From the preceeding discussion and Examples, it becomes obvious that the intermetallic compound of the invention is not only capable of sorbing and storing hydrogen, but is capable of selectively absorbing hydrogen in the presence of substantial amounts of both CO and $CO_2$ in addition to other gases.

The embodiments of this invention in which an exclusive property of privilege is claimed are defined as follows:

1. An oxygen stabilized intermetallic compound capable of reversibly sorbing hydrogen having the chemical formula $Zr_xVO_y$ where x=0.7 to 2.0 and y=0.18 to 0.33.

2. The method of storing hydrogen comprising contacting an active form of an oxygen stabilized intermetallic compound having the formula $Zr_xVO_y$, where x=0.7 to 2.0 and y=0.18 to 0.33, with gaseous hydrogen at a pressure above the dissociation pressure of hydride.

3. The method of claim 2 wherein the pressure is at least $10^{-6}$ Torr and the temperature is from $-196°$ C. to 450° C.

4. A method for separating hydrogen from a gaseous mixture comprising:
   contacting an active form of the intermetallic compound $Zr_xVO_y$, where x=0.7 to 2.0 and y=0.18 to 0.33, with a gaseous mixture at a pressure of at leas 1.4 psia and a temperature of at least 25° C. whereby hydrogen in the mixture is absorbed to form a metal hydride.

5. The method of claim 4 wherein the gaseous mixture is CO and $H_2$.

6. The method of claim 5 wherein the mixture contains at least 40 volume percent $H_2$.

7. The method of claim 4 wherein the active form of the intermetallic compound is conditioned by contacting the compound with CO at a pressure of at least 1.4 psia and a temperature of at least 200° C. in an amount sufficient to saturate the compound with CO, before contacting the conditioned compound with the gaseous mixture.

* * * * *